United States Patent Office 2,737,462
Patented Mar. 6, 1956

2,737,462
PROCESS OF STIFFENING FELTED BODIES

Milton J. Scott, Lexington, Mass., assignor to Monsanto Chemical Company, St. Louis, Mo., a corporation of Delaware No Drawing. Application August 28, 1951,
Serial No. 244,100

10 Claims. (Cl. 117—55)

The present invention relates to improvements in the art of stiffening felted fiber bodies such as, for example, felted wool or animal fur hat bodies and to the articles so produced.

It has been the procedure heretofore in the commercial manufacture of wool or animal fur hat bodies to treat the felted hat body in an aqueous alkaline solution or dispersion of natural shellac, to precipitate the shellac on the felted hat body, after which the solution is expressed from the felted hat body which is then dried and subjected to the normal finishing operations such as sanding, blocking and drying. Although shellac has been used practically exclusively for such purposes for long periods of time it has several disadvantages. For example, shellac has a yellowish color which is objectionable in white or light colored felted hats unless the color is removed by bleaching which requires a separate treating operation.

In view of the foregoing disadvantages in the use of shellac attempts have been made heretofore to use various synthetic polymeric materials instead of shellac for stiffening felted hat bodies. However, the polymeric materials which have been proposed or tested heretofore have had a number of disadvantages which make them inferior to shellac and therefore unacceptable. For example, some polymeric materials such as aqueous polystyrene dispersions filter out on the surface of the felted body during application and do not penetrate into the felted body. Such materials are not satisfactory. Other polymeric materials such as, for example, copolymers of equal molecular proportions of vinyl acetate and maleic anhydrides are too soluble in water under alkaline or acid conditions and do not precipitate in the felted hat body within the period of time required in mill operations and are therefore unsatisfactory. Moreover, such copolymers do not have satisfactory water resistance. Other polymeric materials such as copolymers of styrene and maleic anhydride or esters of maleic acid have the ability to precipitate in the felted hat body but they form a film which is unsatisfactory in that the body does not remain stiff on working and blocking. Some polymeric materials are too soft and clog the sanding devices used in sanding the treated felted hat bodies while other polymeric bodies are too hard and rupture during use with the result that the hat body loses its stiffness. Still other polymeric materials do not have a sufficiently low softening point and will not fuse during steaming and do not permit re-shaping of the hat body. Rosin has been used heretofore but it has a very poor flex life and a felted hat body treated therewith will not retain its original stiffness. Other polymeric materials have poor color stability when exposed to ultra-violet light, or give off an objectionable odor or are not resistant to dry cleaning fluids. As far as is known none of the synthetic or natural polymeric materials tested or proposed heretofore have been satisfactory for stiffening felted hat bodies with the exception of shellac, and shellac has the disadvantages hereinbefore enumerated.

It is therefore one object of the present invention to treat felted fiber bodies, and particularly felted wool or animal fur hat bodies, with a synthetic polymeric material to produce a finished product which has all of the advantages of a shellac treated product without the disadvantages inherent in the use of shellac or of the polymeric materials referred to above.

It is a further object of this invention to provide a process for treating felted wool or animal fur hat bodies to produce a stiffened hat body which may be subjected to the normal finishing operations such as sanding, breaking, blocking and the like and which may be reshaped by steaming without the necessity for bleaching the hat body during or after the manufacturing operation.

It is a further object of this invention to provide an improved felted hat body, and particularly a felted wool or animal fur hat body which is permanently stiffened and has all of the advantages of a shellac treated felted hat body and which does not require bleaching when formed into a white or light colored hat.

Still further objects and advantages of the present invention will appear in the following description and the appended claims.

It has presently been found that when a felted body, particularly a wool or animal fur felted hat body is impregnated, in accordance with a process which will be described in greater detail hereinafter, with a copolymer containing from 85 to 99 mol per cent of combined vinyl acetate and from 15 to 1 mol per cent of combined ethylenically unsaturated aliphatic monocarboxylic acid such as crotonic acid, or combined ethylenically unsaturated aliphatic dicarboxylic acid or anhydride or a half ester of such acid, as for example, maleic acid or butyl acid maleate, which copolymer has certain properties as described hereinafter, a felted body is obtained which is permanently stiffened and is capable of being sanded, blocked and otherwise finished in the normal manner and is also capable of being reshaped by steaming and does not require bleaching during or after the manufacturing operation.

The term "felted bodies" as used herein is intended to include felted materials which are intended primarily for the manufacture of men's and women's hats and which comprise felted wool or other felted animal fibers either wholly or predominately, or felted animal furs either wholly or predominately and which may contain minor proportions, for example, less than 20% by weight of non-felting fibers, preferably non-felting synthetic polymer fibers such as staple fibers produced from polyacrylonitrile, copolymers of at least 60% acrylonitrile and a vinyl or vinylidene compound co-polymerizable therewith, linear polyamides such as polyhexamethyleneadipamide, polyvinylidine chloride, copolymers of vinyl chloride and vinyl acetate or the like. The processes of this invention are particularly suitable for the stiffening of felted all wool hat bodies or felted all animal fur hat bodies or felted hat bodies composed entirely of mixtures of wool fibers and animal fibers or furs and, accordingly, the treatment of such hat bodies is preferred.

The process of impregnating the felted body with the copolymer is carried out, in general, by immersing all or part of the felted body while it is in an acidic condition and at a pH below 4.0 in a weakly alkaline aqueous solution or dispersion of the copolymer until the liquid expressed from the body is clear, but not exceeding 120 seconds, after which the felted body is removed from the solution or dispersion and is squeezed gently, for example, by passing it between squeeze rolls, to obtain a pick up of about 100 to 175% by weight of the solution or dispersion, based on the dry weight of the felted body.

After the copolymer is set or precipitated in the felted body, the felted body is hydroextracted to remove excess water and is then dried and finished in the normal manner, that is, it is subjected to a breaking operation, sanding and blocking.

The felted body, which is to be impregnated as described above, is preferably impregnated while it is still wet from the dyeing solution which is in most instances at a pH between about 2.5 and 3, but which may be at a pH between about 2 and 4. If the felted body is dyed prior to the impregnation with the copolymer and then allowed to dry, it is preferably wetted out with water which is adjusted to a pH between about 2 and 4, if the felted body is not already at such a pH, prior to the impregnation of the felted body. The felted body is preferably adjusted to a pH between about 2 and 3 during dyeing or subsequent to dyeing using sulfuric acid. However, satisfactory results are also obtained with other inorganic acids such as hydrochloric acid or with relatively strong organic acids such as acetic acid. It is not essential that the felted body be dyed prior to impregnation with the copolymer, as long as the felted body is adjusted to the proper pH prior to such impregnation. The impregnated felted body is capable of being dyed with acid dyestuffs and other dyestuffs which are capable of dyeing wool or other animal fibers or animal furs either with or without the use of dyeing assistants.

The amount of the copolymer applied to the felted body is governed primarily by the concentration of the copolymer in the aqueous solution or dispersion thereof, the acidity of the felted body, the duration of immersion of the felted body in such solution or dispersion and the degree of pick up attained by squeezing the felted body after immersion. In the case of felted all wool or all animal fiber hat bodies it is usually necessary to apply at least 3% by weight of the copolymer based on the dry weight of the felted body in order to obtain the desired stiffness while amounts in excess of 10% by weight of the copolymer, based on the dry weight of the felted body, usually provide a felted body which is excessively stiff. In the case of animal furs smaller amounts, that is, as low as 1.5% by weight of the copolymer, based on the dry fur weight, will usually provide the necessary stiffness. The maximum amount of copolymer applied to such animal furs is 8% by weight, based on the weight of the dry animal furs.

To apply the above described amounts of copolymer to the felted bodies with a pick up of 100 to 175% of the solution or dispersion of the copolymer, based on the dry felted body, it is generally necessary to use a solution or dispersion containing from 1.5 to 10% by weight of the copolymer.

After the acidified felted body is immersed either wholly or partly in the aqueous solution or dispersion of the copolymer it usually requires from about 30 to 90 seconds for the copolymer in the aqueous solution or dispersion to precipitate in the felted body, although periods of immersion as long as 120 seconds may be required in some instances depending on the acidity of the felted body and the alkalinity of the solution or dispersion of the copolymer. Satisfactory precipitation is determined by removing the felted body within the time periods described above and squeezing the felted body. If the liquid expressed from the felted body by squeezing is clear the precipitation of the copolymer is satisfactory. On the other hand, if the liquid expressed from the felted body is cloudy, the precipitation of the copolymer is unsatisfactory either because there is no precipitation or because the precipitation rate is too slow. If the liquid expressed from the felted body is not clear after immersion for a period up to 120 seconds, using the test described above, the treatment is not satisfactory.

Unsatisfactory precipitation is usually due to one or more of the following factors: (1) the felted body is not sufficiently acid when it is immersed in the aqueous solution or dispersion of the copolymer; (2) the aqueous solution or dispersion of the copolymer contains too much alkali; or (3) the copolymer used is too soluble under acid conditions and will not precipitate out of solution. Accordingly, it is necessary to correlate the above factors to obtain the proper precipitation of the copolymer in the felted body within an immersion period of 30 to 120 seconds.

The copolymers used in the processes of this invention are prepared, in general, by copolymerizing from about 85 to 99 mol percent of vinyl acetate with from about 15 to 1 mol percent of ethylenically unsaturated aliphatic monocarboxylic acid containing from 3 to 5 carbon atoms such as crotonic acid, acrylic acid, methacrylic acid, isocrotonic acids and the like, preferably crotonic acid, or from about 15 to 1 mol percent of an ethylenically unsaturated aliphatic dicarboxylic acid or anhydride containing from 4 to 8 carbon atoms such as maleic acid, maleic anhydride, fumaric acid, itaconic acid and the like or alkyl half esters of such dicarboxylic acids, in which the alkyl group contains from 1 to 4 carbon atoms. Mixtures of such acids and half esters may also be used. Such copolymers may be suitably prepared, for example, by first forming an aqueous neutral emulsion of the respective monomers in the presence of a peroxide catalyst such as hydrogen peroxide or benzoyl peroxide and an anionic surface active emulsifying agent such as alkali salts of alkane sulfonic or sulfuric acids, containing at least 10 carbon atoms, alkali salts of alkyl benzene sulfonic acids in which the alkyl group contains at least 10 carbon atoms, alkali salts of fatty acids and the like. Other catalysts and emulsifying agents may be used as will be apparent to those skilled in the art. The resulting emulsion is heated at a temperature between 40 and 80° C. until a conversion of at least 70% of the monomers to the copolymers is obtained which usually requires between about 5 and 30 hours depending on the size of the batch, the temperature used and other factors. The product thus obtained is an aqueous dispersion of the copolymer which may contain a minor amount of unreacted monomers. The particles of copolymer separate from the dispersion in the form of beads after which the precipitated copolymer is removed by filtration, centrifuging or the like and finally dried in the form of fine particles.

The copolymers are also suitably prepared by mass polymerization, that is, by first mixing the monomers in the presence of a peroxide catalyst such as benzoyl peroxide or ditertiary butyl peroxide but in the absence of solvents or diluents and then heating the resulting mass, for example, at a temperature between about 40 and 150° C. until substantial conversion of the monomers to a copolymer is effected. On cooling a solid mass is obtained which mass is readily comminuted by grinding or the like to a finely divided powder. Other processes of preparing the copolymers may also be used.

It is essential in the practice of the processes of this invention that the copolymer used is soluble or dispersible in a weakly alkaline aqueous solution of ammonia or sodium hydroxide or sodium borate. For best results the copolymer should have a molecular weight such that an aqueous ammonia solution containing 20% by weight of the dissolved or dispersed copolymer has a Hoeppler viscosity within the range of 5 to 20 centipoises at a pH between 8.0 and 9.5 and at a temperature of 20° C., and a softening point between 140 and 150° C. as measured by the ball and ring method. If the molecular weight and softening point of the copolymer are appreciably above the values specified above, the felted body impregnated with such copolymer is difficult to shape by steaming and pressing. If the molecular weight and softening point of the copolymer are appreciably below the values specified above, the felted body impregnated with such copolymer is not sufficiently stiff unless excessive amounts of the copolymer are applied.

The aqueous solutions or dispersions of the copolymers used in the processes of this invention are suitably prepared by agitating the copolymer while it is in the form of beads or a finely divided powder, in a weakly alkaline aqueous solution of an alkali metal hydroxide, ammonia or an alkaline, alkali metal salt such as sodium borate. The amount of such hydroxide, ammonia, or salt used should be sufficient to dissolve or disperse the copolymer in the solution and to provide a solution or dispersion having a pH of at least 7.0, but the final pH of the solution or dispersion should not exceed 9.0. The preferred compound for dissolving or dispersing the copolymer in the aqueous solution is sodium borate or borax. Best results have been obtained with aqueous solutions or dispersions of a copolymer of 95 to 98 mol percent of vinyl acetate and 5 to 2 mol percent of crotonic acid or a copolymer of 95 to 98 mol percent of vinyl acetate and 5 to 2 mol percent of maleic acid or a copolymer of 95 to 98 mol percent of vinyl acetate and 5 to 2 mol percent of the secondary butyl half ester of maleic acid, and the use of such solutions or dispersions is preferred in the processes of this invention.

The term "solution" as used in the appended claims is intended to include true solutions, colloidal solutions and dispersions of the copolymers hereinbefore described since the copolymer is believed to be present in the weakly alkaline aqueous medium partly as a solute, partly as a colloid and partly as a disperse phase.

A further understanding of the processes and felted articles of this invention will be obtained from the following specific examples which are intended to illustrate this invention but not to limit the scope thereof, parts and percentages being by weight unless otherwise specified.

*Example I*

Two hundred parts of dry beads of a copolymer containing 97 mol percent of combined vinyl acetate and 3 mol percent of combined secondary butyl half ester of maleic acid and having a Hoeppler viscosity of 10 centipoises when dissolved or dispersed in the form of a 20% solution in aqueous ammonia at a pH of 8.4 and at 20° C., and having a softening point of 147° C., were added gradually with agitation to 2460 parts of water to which had been added 240 parts of a 10% solution of borax in water. The temperature of the mixture was raised to 180° F. and the agitation was continued for a total of 45 minutes, after which time a milky dispersion having a pH of 8.5 (glass electrode) was obtained. This dispersion was then filtered to remove impurities.

An all wool felt hat body, which had just been dyed in an aqueous dye bath adjusted to a pH of 3 with sulfuric acid, was immersed while it was still wet in the aqueous dispersion of the copolymer prepared as described immediately above. After the felt body was immersed in the dispersion for 60 seconds it was removed and liquid was expressed therefrom by squeezing the felt body. The expressed liquid was clear indicating that the copolymer in the dispersion had precipitated in the felt body. The felt body was then hydroextracted in a centrifuge until it contained about 60% of liquid and copolymer solids, based on the dry weight of the felt body, and finally dried at a temperature of 180° F. The felt body was next sanded in the normal manner and then shaped by steaming and pressing. The felt body responded to these processing operations in a very satisfactory manner and had a permanent stiffness. The felt body did not lose its stiffness on bending or breaking and was readily re-shaped by steaming and pressing.

*Example II*

An aqueous dispersion of a copolymer of 97 mol percent of combined vinyl acetate and 3% of combined crotonic acid having a Hoeppler viscosity of 15.8 centipoises when dissolved or dispersed in the form of a 20% solution in aqueous ammonia at a pH of 9.5 and at a temperature of 20° C., and having a softening point of 146° C., was prepared using the proportions of ingredients and procedure described in the first paragraph of Example I. The resulting milky dispersion had a pH of 8.2 (glass electrode).

A felt hat body containing 90% wool fibers and 10% rabbit fur was first immersed in a water solution of sulfuric acid at a pH of 2.8 (glass electrode) and was next immersed while it was still wet in the aqueous dispersion of the copolymer prepared as described immediately above. After an immersion period of 70 seconds the felt hat body was removed from the dispersion and was squeezed. The liquid expressed by squeezing was clear indicating that the copolymer in the dispersion had precipitated in the felt body. The felt body was then hydroextracted in a centrifuge until it contained about 70% of liquid and copolymer solids, based on the dry weight of the felt body, and finally dried at a temperature of 160° F. The felt body was next sanded in the normal manner and then shaped into the form of a man's hat by steaming and pressing. The sanding and shaping of the felt body was carried out without difficulty and with excellent results. The felt hat body, which was not dyed prior to the above treatment, had substantially the same color after treatment it had prior to the treatment and was not colored by the copolymer therein. The felt hat body was permanently stiffened and did not lose its stiffness on bending or breaking and was readily re-shaped by steaming and pressing.

*Example III*

An aqueous dispersion of a copolymer containing 97 mol percent of combined vinyl acetate and 3 mol percent of combined maleic acid having a Hoeppler viscosity of 12.5 centipoises when dissolved or dispersed in the form of a 20% solution in aqueous ammonia at a pH of 8.8 and at a temperature of 20° C., and having a softening point of 145° C. as determined by the ball and ring method, was prepared using the proportions of ingredients and procedure described in the first paragraph of Example I. The resulting milky dispersion had a pH of 8.0 (glass electrode).

An all rabbit fur felt hat body was first immersed in a water solution of sulfuric acid at a pH of 2.5 (glass electrode) and was then immersed while it was still wet, in the aqueous solution or dispersion of the copolymer prepared as described immediately above. After an immersion period of 90 seconds the felt hat body was removed from the dispersion and squeezed gently between pad rolls adjusted to obtain a pick-up of liquid and copolymer solids of 100%. The liquid expressed from the felt hat body during squeezing was clear indicating that the copolymer had precipitated in the hat body. The felt hat body was next hydroextracted in a centrifuge until it contained about 70% of liquid and copolymer solids, based on the dry weight of the felt body, and finally dried at a temperature of 170° F. The felt body was next sanded in the normal manner and then shaped into the form of a man's hat by steaming and pressing. The sanding and shaping of the felt hat body was carried out easily and with excellent results. The felt body, which was not dyed prior to the above treatment, was not discolored by the treatment. The felt hat was permanently stiffened and did not lose its stiffness on bending or breaking and was readily re-shaped by steaming and pressing.

The felted bodies produced in accordance with the processes of this invention are uniformly impregnated with from about 1.5 to 10% by weight of the copolymer which is uniformly distributed throughout the impregnated portion of the felted body in the form of fine particles which serve to spot weld the individual fibers or fur in the body to each other. Thus, the stiffness of the felted body is due to the rigidity with which the fibers or fur are held in position by the binding action of the particles of the copolymer rather than the presence of a continuous film of the copolymer.

Although the processes of this invention have been illustrated in connection with the total immersion and impregnation of felted bodies in a single aqueous solution or dispersion of the copolymer it is to be understood that the processes of this invention are also applicable to the partial immersion and partial impregnation of felted bodies in one or more aqueous solutions or dispersions of the copolymer, which solutions or dispersions may contain varying concentrations of the copolymer. It is intended that these modifications of the processes of this invention be included in the terms "immersing" and "impregnating" or "impregnated" as used herein and in the appended claims.

Other modifications and changes in the processes described herein will be apparent to those skilled in the art to which this invention appertains without departing from the spirit and intent of the present invention. It is to be understood, therefore, that it is not intended to limit this invention except by the scope of the appended claims.

What is claimed is:

1. A process of stiffening a felted body composed principally of animal fiber or fur which comprises adjusting said body to a pH below 4; immersing said body in an aqueous solution, having a pH between 7.0 and 9.0, of a copolymer containing from 85 to 99 mol percent of combined vinyl acetate and from 15 to 1 mol percent of a combined substance selected from the group consisting of (1) ethylenically unsaturated aliphatic monocarboxylic acids containing from 3 to 5 carbon atoms, (2) ethylenically unsaturated aliphatic dicarboxylic acids and anhydrides thereof containing from 4 to 8 carbon atoms, (3) alkyl half esters of said dicarboxylic acids, in which the alkyl group contains from 1 to 4 carbon atoms and (4) mixtures thereof, until the solution obtained from said body by squeezing is clear, but not exceeding 120 seconds; removing said felted body from said solution; extracting excess solution from said felted body until said body contains from 1.5 to 10% by weight of said copolymer, based on the dry weight of said felted body, and thereafter drying said body.

2. A process of stiffening a felted hat body composed principally of animal fibers or fur which comprises immersing said body in an aqueous medium having a pH below 4; immersing said body in an aqueous solution of a copolymer containing from 85 to 99 mol percent of combined vinyl acetate and from 15 to 1 mol percent of a combined substance selected from the group consisting of (1) ethylenically unsaturated aliphatic monocarboxylic acids containing from 3 to 5 carbon atoms, (2) ethylenically unsaturated aliphatic dicarboxylic acids and anhydrides thereof containing from 4 to 8 carbon atoms, (3) alkyl half esters of said dicarboxylic acids, in which the alkyl group contains from 1 to 4 carbon atoms and (4) mixtures thereof, the said solution having a pH between 7.0 and 9.0 and containing from 1.5 to 10% of said copolymer, said copolymer having a softening point between 140 and 150° C. and a Hoeppler viscosity within the range of 5 to 20 centipoises at a concentration of 20% by weight in a water solution of ammonia at a pH between 8.0 and 9.5 and at a temperature of 20° C., said felted body being immersed in said solution until the liquid obtained from said body by squeezing is clear but not exceeding 120 seconds; removing said felted body from said solution; extracting said felted body until it contains from 1.5 to 10% by weight of said copolymer, based on the dry weight of said felted body, and thereafter drying said body.

3. A process according to claim 2, but further characterized in that said copolymer is a copolymer of vinyl acetate and crotonic acid.

4. A process according to claim 2, but further characterized in that said copolymer is a copolymer of vinyl acetate and maleic acid.

5. A process according to claim 2, but further characterized in that said copolymer is a copolymer of vinyl acetate and a butyl half ester of maleic acid.

6. A process of stiffening a felted hat body composed principally of felted animal fibers which comprises immersing said body in an aqueous medium containing sulfuric acid and having a pH of at least 2 but below 4; immersing said body while it is still wet with said acidic medium in an aqueous solution of a copolymer containing from 95 to 98 mol percent of combined vinyl acetate and from 5 to 2 mol percent of a combined substance selected from the group consisting of (1) ethylenically unsaturated aliphatic monocarboxylic acids containing from 3 to 5 carbon atoms, (2) ethylenically unsaturated aliphatic dicarboxylic acids and anhydrides thereof containing from 4 to 8 carbon atoms, (3) alkyl half esters of said dicarboxylic acids in which the alkyl group contains from 1 to 4 carbon atoms, and (4) mixtures thereof, said solution containing from 3 to 10% by weight of said copolymer and sufficient sodium borate to provide a pH between 7.0 and 9.0 said copolymer having a softening point between 140 and 150° C. and having a Hoeppler viscosity within the range of 5 to 20 centipoises at a concentration of 20% by weight in a water solution of ammonia at a pH between 8.0 and 9.5 and at a temperature of 20° C., said felted body being immersed in said solution until the solution obtained by squeezing said body is clear but not exceeding a time period of 120 seconds; removing said body from said solution; extracting said body until it contains from 3 to 10% by weight of said copolymer based on the dry weight of said body, and thereafter drying said body.

7. A process according to claim 6, but further characterized in that said felted hat body is composed of at least 80% wool fibers.

8. A process according to claim 7, but further characterized in that said copolymer is a copolymer of vinyl acetate and crotonic acid.

9. A process according to claim 7, but further characterized in that said copolymer is a copolymer of vinyl acetate and maleic acid.

10. A process according to claim 7, but further characterized in that said copolymer is a copolymer of vinyl acetate and a butyl half ester of maleic acid.

References Cited in the file of this patent

UNITED STATES PATENTS

| | | |
|---|---|---|
| 1,825,509 | Collins | Sept. 29, 1931 |
| 1,930,646 | Gray et al. | Oct. 17, 1933 |
| 2,526,605 | Fraser | Oct. 7, 1950 |
| 2,554,089 | Croce | May 22, 1951 |